US009535818B2

(12) United States Patent
Vasudevan et al.

(10) Patent No.: US 9,535,818 B2
(45) Date of Patent: Jan. 3, 2017

(54) IDENTIFYING HIGH IMPACT BUGS

(71) Applicant: MICROSOFT, Redmond, WA (US)

(72) Inventors: Janani Vasudevan, Redmond, WA (US); Andrew Precious, Seattle, WA (US); Firoz Dalal, Sammamish, WA (US); Herman Widjaja, Seattle, WA (US); Jarred Bonaparte, Seattle, WA (US); Todd Frost, Woodinville, WA (US); Ryan Segeberg, Covington, WA (US); Rajkumar Mohanram, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 309 days.

(21) Appl. No.: 13/652,964

(22) Filed: Oct. 16, 2012

(65) Prior Publication Data

US 2014/0109053 A1    Apr. 17, 2014

(51) Int. Cl.
    *G06F 11/36*    (2006.01)
(52) U.S. Cl.
    CPC ....... *G06F 11/3664* (2013.01); *G06F 11/3692* (2013.01)
(58) Field of Classification Search
    None
    See application file for complete search history.

(56) References Cited

U.S. PATENT DOCUMENTS

| 8,074,119 B1 * | 12/2011 | Rao ........................... G06F 8/20 |
| | | 714/38.1 |
| 8,151,248 B1 * | 4/2012 | Butler et al. ................. 717/124 |
| 2003/0066049 A1 | 4/2003 | Atwood et al. |
| 2004/0153822 A1 * | 8/2004 | Arcand et al. ................... 714/38 |
| 2005/0138536 A1 * | 6/2005 | Smith ................. G06F 11/3664 |
| | | 714/799 |
| 2010/0100871 A1 * | 4/2010 | Celeskey et al. ............. 717/124 |
| 2010/0131450 A1 | 5/2010 | Nguyen et al. |
| 2010/0251215 A1 | 9/2010 | Yawalkar et al. |

OTHER PUBLICATIONS

"International Search Report & Written Opinion for PCT Patent Application No. PCT/US2013/065156", Mailed Date: Jan. 21, 2014, Filed Date: Oct. 16, 2013, 10 pages.
Gousset, et al., "Chapter 23: Manual Testing", In Book—Professional Application Lifecycle Management with Visual Studio, Sep. 19, 2012, pp. 1-21.

* cited by examiner

*Primary Examiner* — Philip Wang
*Assistant Examiner* — Amir Soltanzadeh
(74) *Attorney, Agent, or Firm* — Sunah Lee; Dan Choi; Micky Minhas

(57) ABSTRACT

Test cases are executed by the software engineering test system. The test cases target software products. Test outputs are generated indicating whether the software engineering test system determined the test cases to have passed or failed. Separately, bug records are stored in a first dataset whose records identify corresponding bugs. Records of the test case executions are stored in a second dataset. Records thereof indicate whether a corresponding test case failed when executed. Such records may have bug identifiers entered by a test engineer and corresponding to bugs identified by the test engineer. The first dataset is parsed to identify records of test runs that have failed, and for each such test run record a bug identifier thereof is identified. Statistics such as failure counts are updated for the bugs found in the test run records.

13 Claims, 6 Drawing Sheets

110

| test run ID | test case | pass/fail | associated bug(s) | ... |
|---|---|---|---|---|
| 007 | caseA | F | 1 | ... |
| 008 | caseB | F | 1 | ... |
| 009 | caseA | F | 4, 7 | ... |
| 010 | caseD | F | 2 | ... |
| 011 | caseB | F | 3 | ... |
| ... | ... | ... | ... | ... |

112

| Bug ID | added | patch/fix | status | ... |
|---|---|---|---|---|
| 1 | 1/1/2012 | ... | ... | ... |
| 2 | 3/14/2012 | ... | ... | ... |
| 3 | 4/2/2012 | ... | ... | ... |
| 4 | 4/12/2012 | ... | ... | ... |
| 5 | 6/13/2012 | ... | ... | ... |
| ... | ... | ... | ... | ... |

| Bug ID | date | failure count | ... |
|---|---|---|---|
| 1 | 1/1/2012 | 5 | ... |
| 2 | 1/1/2012 | 1632 | ... |
| 3 | 1/1/2012 | 42 | ... |
| 4 | 1/1/2012 | 39 | ... |
| 5 | 1/1/2012 | 13 | ... |
| ... | ... | ... | ... |
| 1 | 1/8/2012 | 7 | ... |
| 3 | 1/8/2012 | 32 | ... |
| 4 | 1/8/2012 | 66 | ... |
| 5 | 1/8/2012 | 155 | ... |
| 6 | 1/8/2012 | 27 | ... |
| ... | ... | ... | ... |

FIG. 5

IDENTIFYING HIGH IMPACT BUGS

BACKGROUND

Identifying high impact bugs within a software engineering environment is useful to help prioritize engineering resources and streamline the engineering process cycle. A typical software engineering environment usually includes both (i) an automation system and (ii) a bug tracking system.

An automation system usually has physical hardware resources such as servers, test networks, and databases, as well as software used to execute tests. An automation system automates testing of software products, captures test results, schedules tests, and may perform other known test functions.

A bug tracking system is a software tool that usually provides a front end to a database, often stored remotely on a server. Test engineers typically file database records, known as bugs, which can be tracked to prioritize and fix product issues. Prioritization has previously been managed manually via a software product team, for instance, based on the severity of the issue reported. This manual triage process has problems. Engineers are unable to identify bugs that have systemic affects (e.g., bugs that can lower the throughput of the engineering system) or that create a disproportionate number of software failures. Bugs that may occur for different independent software products and that cause widespread test failures for those software products have had low visibility.

Techniques related to identifying high impact bugs are discussed below.

SUMMARY

The following summary is included only to introduce some concepts discussed in the Detailed Description below. This summary is not comprehensive and is not intended to delineate the scope of the claimed subject matter, which is set forth by the claims presented at the end.

Test cases are executed by the software engineering test system. The test cases target software products. Test outputs are generated indicating whether the software engineering test system determined the test cases to have passed or failed. Separately, bug records are stored in a first dataset whose records identify corresponding bugs. Records of the test case executions are stored in a second dataset. Records thereof indicate whether a corresponding test case failed when executed. Such records may have bug identifiers entered by a test engineer and corresponding to bugs identified by the test engineer. The first dataset is parsed to identify records of test runs that have failed, and for each such test run record a bug identifier thereof is identified. Statistics such as failure counts are updated for the bugs found in the test run records.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

FIG. 4 shows details of a test results database and the bug database.

FIG. 5 shows accumulated bug statistics.

DETAILED DESCRIPTION

Embodiments discussed below relate to identifying high impact bugs. Discussion will begin with an explanation of an example engineering test system and how human activity and data flows through the system. Examples of information stored by the engineering test system will be described next, including bug information and test results information. This will be followed by discussion of a software tool to use the stored information to identify high impact bugs.

Figure 1:
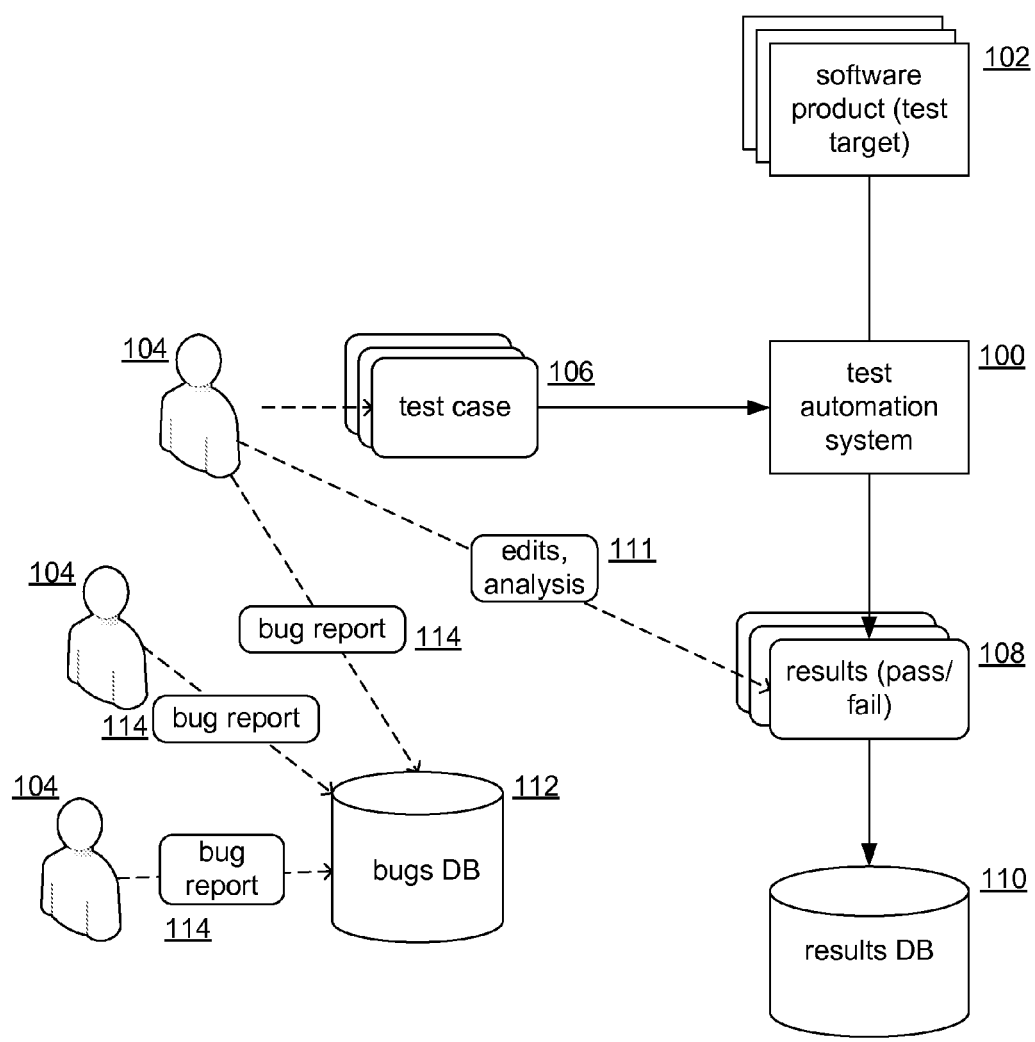
FIG. 1 shows an example engineering test automation system.

FIG. 1 shows an example engineering test automation system 100. Various software products 102 are subjected to testing by the test automation system 100. Software products 102 may be any of a variety of applications, servers, development tools, word processors, operating systems, and others. Engineers 104 author test cases 106. A test case 106 may be a formal specification, for example conforming to a schema interpretable by the test automation system 100. A test case 106 may contain test information for a test of a corresponding software product 102. For example, such information might identify a target software product 102 and/or a version level thereof, input data to be processed by the target software product 102, runtime flags of the test automation system 100 or the target software product, simulated hardware conditions, functions or features to be tested, a patch to be applied, metadata identifying related tests, and so forth. Test cases 106 may also be embodied as data in a database, flat text files, scripts executable by the test automation system 100, etc.

The test automation system 100 is an environment that controls and monitors execution of tests. The test automation system 100 runs a test case 106 under controlled conditions, initially parsing the test case 106, identifying and marshaling resources as needed, opening log files, assuring that input data is available, initiating network, server, or client connections or other prerequisites for the test, etc. The test automation system 100 then executes the target software product 102 until the test is determined by the test automation system 100 to have completed, at which time the test automation system 100 generates a corresponding test report 108. The test automation system 100 determines whether a test case run (execution of a test case) passed or failed. A failure might result from either failure of the target software product 102 or from a failure of the underlying test automation system 100. For example, a test case run might hang and terminate when a time limit has been reached by the test automation system 100. A test case run might end with a failure code from the target software product 102 when a supporting hardware or software component fails (perhaps due to a latent bug triggered by the test case). The types of things that can cause a test run to fail are well known and extensive.

As noted, the results of test case executions may be captured in test reports 108. Test reports 108 may be any form of recorded data such as flat text files (possibly as markup text), database entries, etc. In the example of FIG. 1, test reports 108 are stored in a test results database 110. An individual test report 108 may store information such as an identifier of a test case 106 that was executed, a date and time of execution, locations of logs, trace files, or other data generated by the test run, diagnostic data, test configuration settings, or other information related to execution of a test case. In particular, a test report 108 may include information indicating whether a test case execution failed or passed.

As discussed above, failure may be a result of a variety of problems originating in either the target software product, the test bed (e.g., the test automation system 100), or both. In one embodiment, test reports 108 are stored in a results database 110, although other forms of storage are equally acceptable, such as a repository or folder of files, a large XML (eXtensible Markup Language) file, or other. In some embodiments, as discussed further below, a test report 108 for a failed test run may also include a field or entry that indicates one or more bugs that have been determined to have caused the test run to fail. For example, per an engineer's 104 analysis or edits 111, a test report 108 might be edited to identify one or more bugs, for example by adding an identifier of a bug (such bug existing as a record in a bug database 112, for example).

The bug database 112 may or may not be a part of the test automation system 100. For example, there might be a bug database 112 or table for each of the software products 102 that is used by a particular product development team. The bugs in the bug database 112 might be, or may correspond to, bug reports 114 filed by engineers 104, by test personnel, by users of the relevant software product 102, or by others. In one embodiment, bugs and test results may be stored as tables in a single database.

Figure 2:
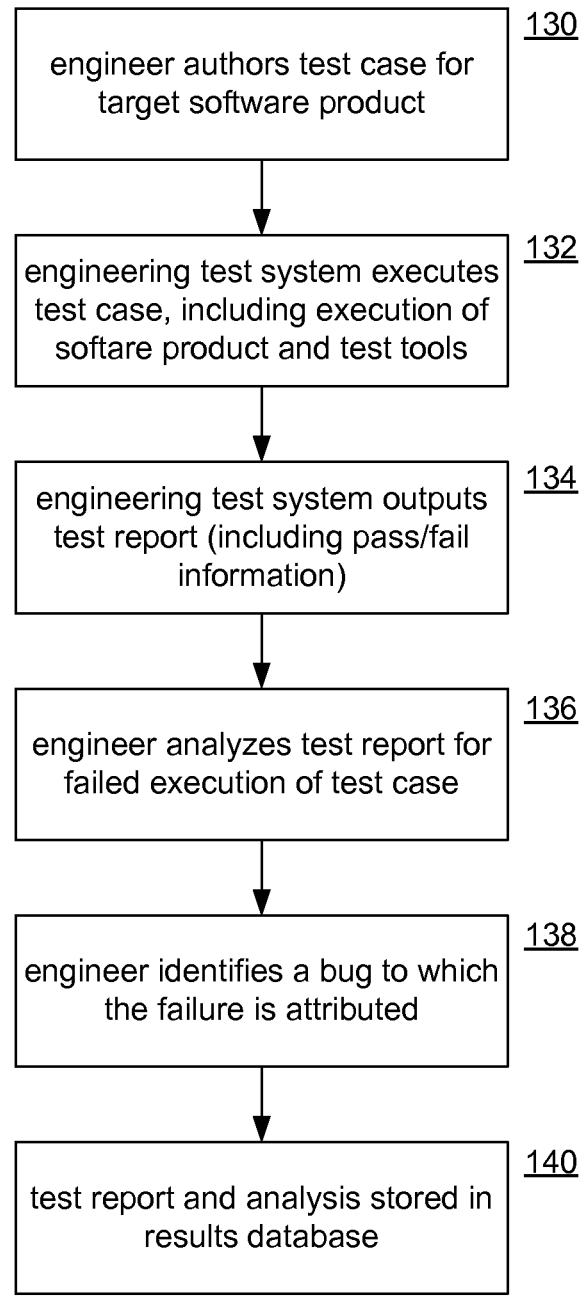
FIG. 2 shows a process corresponding to FIG. 1.

FIG. 2 shows a process corresponding to FIG. 1. At step 130 an engineer 104 authors a test case 106 for a target software product 102. At step 132 the test case is executed, including execution of the target software product 102. At step 134 the automating or engineering test system outputs a test report 108. Subsequently, at step 136 an engineer 104 analyzes the test or test report 108 and at step 138 identifies a bug to which a failure of the test is attributed by the engineer 104. At step 140 the association between the test failure and the identified bug is recorded, for example, as a field in the corresponding test report 108.

Due to the sometimes independent purposes of bugs and test results, bug data and test data is often not logically tied or used in ways that leverages both types of data. For example, bugs may be tracked by persons responsible for a particular software product 102 without concern for testing of the software product 102. Conversely, those who are responsible for testing the software product 102 may be concerned primarily with the execution of tests and providing test results without regard for the causes of test failures. As such, correlations between test results and bugs have not been appreciated or identified.

Figure 3:
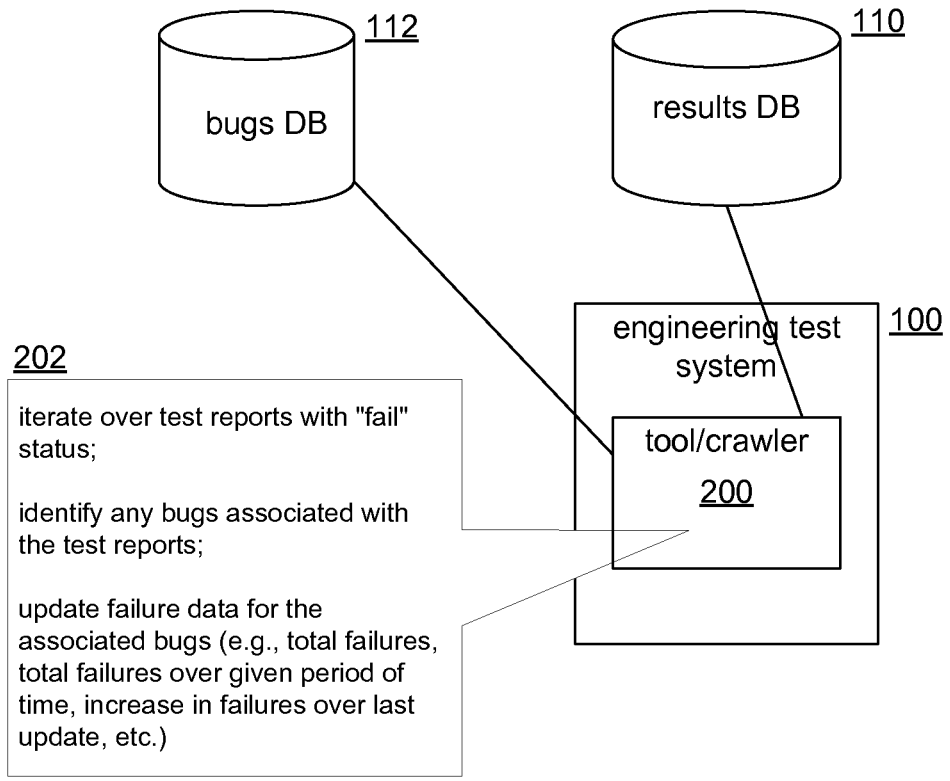
FIG. 3 shows a tool for identifying high impact bugs in the bug database.

FIG. 3 shows a tool 200 for identifying high impact bugs in the bug database 112. The tool 200 may be a part of (or work in conjunction with) the test automation system 100. The tool 200 may be implemented as a stand-alone program that crawls test results such as the results database 110. The tool 200 may also be implemented as a script, a segment of code in a test suite application, a database client, etc. The tool 200 performs a process 202 to identify high impact bugs.

The process 202 may begin with an iteration over test reports or the like that correspond to failed test runs or that have a "fail" status indicating that a corresponding run of a test case did not pass. This may involve parsing test reports or database records in results database 110 to identify those test runs that failed. Next the process 202 may, for each identified test result, identify any bugs associated with such a test report. This may involve identifying content in a file by finding a particular markup tag, reading a field in a database record, performing a text search or pattern match to identify keywords such as names or identifiers of bugs, parsing a link to a separate record that lists bugs, etc.

As the process 202 iterates over the test results, the process 202 collects information about the bugs that have been found in the test results. For example, at the beginning of the process 202 a data structure may be set up (e.g., an associative array) that is indexed by bug identifier, and when a bug is found in the test results an entry indexed by a corresponding bug identifier is incremented to account for the found bug. As the test results are parsed, statistics about the bugs in the test results are accumulated and updated. In one embodiment, the process segments bug statistics by time periods. For example, a new set of statistics may be collected on a periodic basis, and bug analysis can subsequently be performed in the time dimension. Such data collection can be aided by time/date information associated with each test result; a test result's date and time of execution is used as the date and time of a bug referenced therein.

FIG. 4 shows details of the test results database 110 and the bug database 112. The bug database 112 may include or link to a dataset of records, where each record represents a different bug, each having a bug identifier, a date the bug was created, related metadata such as status, and so forth. The results database may serve as another dataset that lists the results of automated runs of test cases. Each entry may represent a different test run, and a same test case may have multiple test runs that were executed at different times. Each test run has a field identifying whether the test run passed or failed. In addition, a field may be included in which one or more bugs can be listed. As noted above, such information is often inputted by a test engineer or other person who has evaluated a test run output to decide what might have been a cause of failure. This bug information, such as an "associated bug(s)" column, is used to collect statistics about individual bugs. In the example of FIG. 4, the bug with bug ID "1" is associated with two test failures. FIG. 5 shows accumulated bug statistics 240. Each bug, identified by an identifier, has a failure count or other statistic (e.g., failure rate), possibly for a date or time period. The bug statistics may be stored as a column in the bug database 112, as a separate dataset or table indexed by bug ID, as a file or spreadsheet, and so on.

In one embodiment, bug statistics may be sub-categorized by the software products with which they are associated. In this manner, it may be possible to identify systemic bugs that are inherent to the test automation system or its infrastructure. Identifying and remedying such bugs may help to improve the overall utilization and throughput of the test automation system. For example, when a driver bug is identified as frequently causing failure of multiple software products (as evidenced by failed test runs thereof), fixing such a bug can have a high impact on overall software product quality.

With regard to remedies, it will be appreciated that the mere existence of test-driven bug statistics can be inherently useful. Software engineers responsible for a software product can directly use such statistics to cull and select bugs for remediation. In addition, such statistics can be useful in generating bug prioritization reports, identifying bugs with high impact over time, automatically prioritizing test runs, and so forth.

Figure 6:
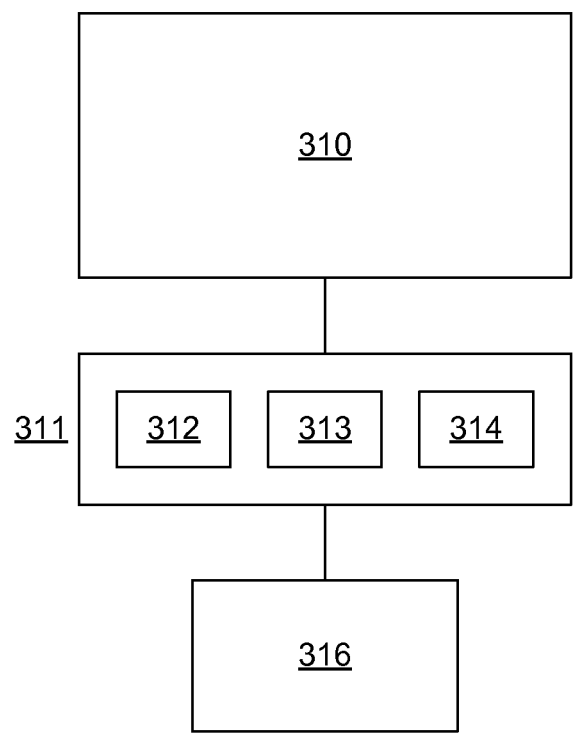
FIG. 6 shows a computing device for implementing embodiments described herein.

FIG. 6 shows a computing device for implementing embodiments described herein. The computing device may have a display 310, a processing component 311 including a processor 312, volatile storage (memory) 313, non-volatile storage 314, and one or more input devices 316. The input devices 316 may be a touch sensitive surface (possibly integrated with display 310), a mouse, a 3D-motion sensor (e.g., a camera), a pressure sensitive tablet surface, and so forth.

Embodiments and features discussed above can be realized in the form of information stored in volatile or non-volatile computer or device readable media. This is deemed to include at least media such as optical storage (e.g., compact-disk read-only memory (CD-ROM)), magnetic media, flash read-only memory (ROM), or any current or future means of storing digital information. The stored information can be in the form of machine executable instructions (e.g., compiled executable binary code), source code, bytecode, or any other information that can be used to enable or configure computing devices to perform the various embodiments discussed above. This is also deemed to include at least volatile memory such as random-access memory (RAM) and/or virtual memory storing information such as central processing unit (CPU) instructions during execution of a program carrying out an embodiment, as well as non-volatile media storing information that allows a program or executable to be loaded and executed. The embodiments and features can be performed on any type of computing device, including portable devices, workstations, servers, mobile wireless devices, and so on.

The invention claimed is:

1. A method of identifying high impact bugs detected by a software engineering test system comprised of one or more computing devices, the method, performed by the one or more computing devices, comprising:
    executing runs of the test cases by the software engineering test system, the test cases authored by test engineers, the test cases targeting software products to be tested, wherein, when test case runs are executed by the software engineering test system, corresponding software products are executed by the software engineering test system and corresponding test outputs are generated indicating whether the software engineering test system determined the test cases to have passed or failed;
    storing bug records in a first data store, each bug record comprising an identifier of a corresponding bug and metadata about the bug entered by a test engineer, wherein at least some of the bug records correspond to failures of the software products that did not occur while the software products were being tested;
    storing, in a second data store, test run records of the outputs of the runs of the tests cases, the test run records comprising records of the test reports, respectively, each test run record indicating whether a corresponding single test case execution failed, each test run record corresponding to only one execution of a corresponding single test case, each test run record comprising one or more of the bug identifiers entered by a test engineer to indicate that a corresponding one of the bug records was identified by the test engineer as a cause of failure of a corresponding test run, wherein at least some of the test run records comprise respective pluralities bug identifiers such that some of the test run records are associated with multiple distinct bugs;
    computing failure statistics for the bug identifiers, respectively, by crawling the first data store to search for test run records that indicate that corresponding test runs failed, determining numbers of occurrences of the respective bug identifiers within the results, and computing the failure statistics according to the respective numbers of occurrences of the respective bug identifiers, wherein each failure statistic indicates the determined number of occurrences of a respective one of the bug identifiers; and
    determining which of the bugs are systemic to the software engineering test system by categorizing the failure statistics according to the software products that the corresponding bugs are associated with.

2. A method according to claim 1, further comprising running a report generating process that generates a report according to the failure statistics of the bug records, and storing the report in storage of the software engineering system.

3. A method according to claim 1, wherein each failure statistic has a corresponding time information indicating a time or a period of time corresponding to the failure statistic, such that for a given time or period of time of a given bug record, a corresponding number or rate of test run failures can be determined.

4. A method according to claim 1, further comprising ranking at least some of the bug identifiers, relative to each other, based on the failure statistics corresponding thereto, and wherein a rank of a bug identifier depends at least on its failure statistic.

5. A method according to claim 4, wherein bugs with higher failure statistics relative to other bugs are given higher priority for debugging relative to the other bugs.

6. A method according to claim 1, wherein at least some of the test run records correspond to, and were triggered by, test run failures that failed due to system bugs of the engineering test system that prevented successful executions of corresponding test runs.

7. A method according to claim 1, wherein the first data store comprises a bug tracking database comprising the bug records, the second data store comprises a testing database, and wherein the crawling is performed by a crawler tool that crawls the testing database to associate test run failures with corresponding bugs.

8. One or more computer-readable storage media that is not a signal, the storage media storing information to enable a computing device to perform a process, the process comprising:
    executing test runs of software products by the software engineering test system, wherein tests runs are executed by the software engineering test system attempting to execute software products targeted by the test runs, the engineering test system comprising a computer having a test suite with access to the software products, wherein the engineering test system determines whether the test runs, respectively, pass or fail, and wherein some determinations of test runs failing do not correspond to failures of the corresponding software products but instead correspond to erroneous failures of components of the engineering test system that prevent completion of the corresponding test runs, and wherein some determinations of test runs failing do not correspond to failures of any components of the engineering test system but rather correspond to failures of the software products;
    accessing bug records in a bugs database;
    automatically storing test run records for the respective test runs, each test run record corresponding to a single corresponding test run, each test run record comprising a respective indication of whether the corresponding test run failed or passed, and each test run record comprising one or more bug-test associations, each bug-test association comprising an indication of a bug record associated with the corresponding test run record, wherein some of the test run records comprise plural bug-test associations such that some of the test run records are associated with plural bugs, the bug-test associations comprising bug diagnoses entered by test engineers, wherein the bug-test associations together indicate which test run failures were determined by the test engineers to be associated with which bugs in the bug database, wherein some of the bug-test associations associate test run failures with bug records corresponding to erroneous failures of components of the engineering test system that prevented completion of the corresponding test runs, and wherein the bug-test associations associate some individual test run records indicating test failures with respective pluralities of bugs in the bug database;

automatically analyzing, by the engineering test system, the bug-test associations, and for the bugs in the bug-test associations, determining respective failure counts, each failure count indicating a number of bug-test associations for the corresponding bug, wherein each failure count corresponds to a number of test runs determined to have failed due a same respective bug;

storing the failure counts in storage of the software engineering test system; and determining which of the bug records represent bugs that are systemic to the software engineering test system by categorizing the failure counts according to the software products that the corresponding bugs are associated with.

9. One or more computer-readable storage media according to claim 8, wherein the failure counts all correspond to a same time period, and wherein an indication of the same time period is stored in association with the failure counts.

10. One or more computer-readable storage media according to claim 8, wherein a given bug has a first failure count corresponding to a first period of time when the analyzing was performed, and the given bug has a second failure count corresponding to a second period of time when the analyzing was performed.

11. One or more computer-readable storage media according to claim 8, the process further comprising executing a bug prioritization process that prioritizes a list of bugs to be fixed, where the prioritization is according to the stored failure counts.

12. One or more computer-readable storage media according to claim 8, wherein each test run is executed by executing a test case authored by a test engineer, each test case specifying test conditions and one of the software products to be tested, and wherein some of the test runs comprise re-executions of same test cases.

13. One or more computer-readable storage media according to claim 12, wherein each bug-test association corresponds to a decision made by a test engineer as a cause of a corresponding failure of a test case.

* * * * *